2,865,707
IRON SALTS

Milton Jones Hogsed, Wilmington, Del., assignor to E. I. du Pont de Nemours and Company, Wilmington, Del., a corporation of Delaware No Drawing. Application November 19, 1954
Serial No. 470,131

18 Claims. (Cl. 23—50)

This invention relates to a new class of iron salts and more particularly to salts of certain iron nitrosyl carbonyls.

Iron carbonyl and certain of its derivatives, such as the dinitrosyl are known and have found utility as catalysts and intermediates in the synthesis of other organic compounds, e. g., as catalysts in acetylene reactions. However the dinitrosyl derivative is thermally unstable and of limited utility.

A new class of thermally stable but reactive nitrosyl derivatives of iron carbonyl has now been discovered. These new compounds are the salts of iron nitrosyl carbonyl hydride, i. e., salts of the acid $$(HOC)Fe(CO)_2NO$$

Included in this class are the metal, ammonium and substituted ammonium salts of this mono-basic acid.

These new salts of iron nitrosyl carbonyl hydride can be prepared by heating aqueous solutions of the desired metal salt of iron carbonyl hydride with a soluble nitrite salt at temperatures of at least 65° C., and preferably higher, or by the direct reaction in inert organic media between iron pentacarbonyl and the nitrite of the desired metal.

The following examples, in which the parts given are by weight, are submitted to illustrate further and not to limit this invention.

*Example I.—Preparation of the potassium salt of iron nitrosyl carbonyl hydride*

A solution of 19.6 parts of iron pentacarbonyl in about 80 parts of methanol was added to 9 parts (0.98 molar proportion) of 93% potassium nitrite in a glass reactor fitted with a reflux condenser and means for heating. The reaction mixture was gently heated to about 35° C. at which point a mildly exothermic reaction began with vigorous evolution of a gas which formed a precipitate when bubbled into barium hydroxide solution. The reaction mixture was allowed to stand overnight and the resulting precipitate removed by filtration. There was thus obtained about 4 parts of by-product ferrous carbonate which gives carbon dioxide and ferrous salts on acidification.

The methanol was removed from the filtrate by distillation under reduced pressure leaving 12 parts of crude potassium salt of iron nitrosyl carbonyl hydride as a crystalline solid. The product was purified by extraction with diethyl ether containing a little methanol. The resultant ether extract was diluted with an equal volume of xylene and ether removed from the mixed solvents by evaporation at room temperature under a stream of nitrogen. There was thus obtained 10 parts (48% of theory) of the pure potassium salt of iron nitrosyl carbonyl hydride as bright, yellow-orange crystals.

*Analysis.*—Calc'd for $(KOC)Fe(CO)_2NO$: C, 17.2%; N, 6.7%. Found: C, 16.8%; N, 6.4%.

*Example II.—Preparation of the potassium salt of iron nitrosyl carbonyl hydride*

To an aqueous solution of 18.4 parts of the potassium salt of iron carbonyl hydride (14.6 parts of iron pentacarbonyl and about 71.5 parts of aqueous 6 N potassium hydroxide solution) was added 12.8 parts (about 1.8 molar proportions based on the carbonyl hydride) of 93% potassium nitrite. The resultant mixture was heated for 15 minutes at about 100° C. Iron oxide precipitated and ammonia was evolved in the exothermic reaction. After the reaction had subsided, the reaction mixture was freed of carbonate by addition of 20 parts of barium chloride in about 75 parts of water. The resultant mixed precipitate of iron oxide and barium carbonate was removed by filtration. The water was removed from the filtrate by distillation under reduced pressure.

The crude solid residue of the potassium salt of iron nitrosyl carbonyl hydride was extracted with several (about 15–20 part) portions of 10:1 ether/acetone mixture and the combined extracts reduced in volume to about 40 parts by evaporation at room temperature under a stream of nitrogen. About 40 parts of toluene was then added and ether removed from the mixed solvents by evaporation at room temperature under a stream of nitrogen. The resultant solid was removed by filtration and washed with benzene and hexane and finally dried by a stream of nitrogen. There was thus obtained 5.5 parts (35% of theory) of the pure potassium salt of iron nitrosyl carbonyl hydride as bright, yellow-orange crystals.

*Analysis.*—Calc'd for $(KOC)Fe(CO)_2NO$: C, 17.2%; N, 6.7%. Found: C, 17.7%; N, 6.5%.

*Example III.—Preparation of the tris(ethylenediamino) nickel-bis salt of iron nitrosyl carbonyl hydride*

Another mixture of 18.4 parts of the potassium salt of iron carbonyl hydride and 10 parts of sodium nitrite was heated together as described in Example II. When the exothermic reaction had subsided, excess tris(ethylenediamino)nickel chloride was added and the resulting precipitate removed by filtration, and washed with water. The crude nickel salt contaminated with unreacted intermediates and by-product iron oxide was taken up in a mixture of acetone and ethyl acetate. The insoluble material was removed by filtration and the mixed solvents removed from the filtrate by evaporation under reduced pressure. The resultant solid was then taken up in diethyl ether and recrystallized therefrom by evaporation of the solvent at room temperature under a stream of nitrogen. There was thus obtained the tris(ethylenediamino)nickel-bis salt of iron nitrosyl carbonyl hydride.

*Analysis.*—Calc'd for $$(C_2H_8N_2)_3Ni[(OC)Fe(CO)_2NO]_2$$

N, 19.3%; Ni, 10.1%; Fe, 19.3%. Found: N, 18.9%, 19.1%; Ni, 9.9%, 10.0%; Fe, 18.7%, 18.9%.

*Example IV.—Preparation of the diammine cadmium-bis salt of iron nitrosyl carbonyl hydride*

An aqueous solution of 18.4 parts of the potassium salt of iron carbonyl hydride was prepared by shaking 14.7 parts of iron pentacarbonyl with 5.5 times its volume of aqueous 6 N potassium hydroxide overnight at room temperature. A solution of ten parts of sodium nitrite in about 20 parts of water was added and the reaction mixture heated slowly to about 100° C. When the resultant exothermic reaction subsided, the reaction mixture was heated to the reflux for a few minutes. After cooling, the solid iron oxide reaction by-product was removed from the reaction mixture by filtration. Excess ammoniacal cadmium chloride solution was added to the filtrate and the resultant crystalline yellow precipitate removed by filtration, washed with water, and dissolved in ethyl acetate. After filtration, about equal parts of toluene were added to the filtrate and the pure diammine cadmium-bis salt of iron nitrosyl carbonyl hydride was obtained as a yellow crystalline solid by evaporation of the mixed solvents at room temperature under a stream of nitrogen.

*Analysis.*—Calc'd for $(NH_3)Cd[(OC)Fe(CO)_2NO]_2$: N, 11.5%; Cd, 23.1%; Fe, 23.0%; C, 14.8%. Found: N, 11.5%; Cd, 23.2%; Fe, 23.8%; C, 14.5%.

*Example V.*—*Preparation of tris(ethylenediamino)cadmium-bis salt of iron nitrosyl carbonyl hydride*

Another reaction between 18.4 parts of the potassium salt of iron carbonyl hydride and 10 parts of sodium nitrite was carried out as described in detail in Example IV above. The filtrate from the reaction mixture, containing in solution the alkali salts of iron nitrosyl carbonyl hydride, was added to excess tris(ethylenediamino)cadmium chloride solution. The resultant precipitate was removed by filtration and recrystallized from ethyl acetate/toluene mixtures as described in the preceding examples. There was thus obtained 9.5 parts (40% of theory) of the pure tris(ethylenediamino)-cadmium-bis salt of iron nitrosyl carbonyl hydride as a crystalline solid.

*Analysis.*—Calc'd for

N, 17.7%; Cd, 17.8%; Fe, 17.7%. Found: N, 17.1%; Cd, 16.9%; Fe, 18.3%.

Suitable specific examples of these salts, in addition to those given in the foregoing detailed examples, include other group I salts, such as the alkali metal salts, e. g., the sodium and lithium salts of iron nitrosyl carbonyl hydride; the group II metal salts, such as the alkaline earth metal salts, e. g., the calcium, magnesium, barium, and strontium-bis salts of iron nitrosyl carbonyl hydride, and the zinc and mercuric-bis salts of iron nitrosyl carbonyl hydride; the salts of group VI metals, such as the chromium-tris salt of iron nitrosyl carbonyl hydride; the group VII metal salts, such as hexammine manganese-bis salt of iron nitrosyl carbonyl hydride; the group VIII metal salts, such as the hexammine cobalt-bis and the tris-phenanthroline ferrous-bis salts of iron nitrosyl carbonyl hydride; the amine salts, such as the pyridinium salt of iron nitrosyl carbonyl hydride; and the like.

Although these salts of iron nitrosyl carbonyl hydride can conveniently be prepared by the reaction in aqueous systems between the desired salt of iron carbonyl hydride and a soluble nitrite salt, preferably of the same metal, at temperatures above 65° C., and preferably in the range 80–100° C., they can equally well be prepared by the reaction in inert organic medium between iron pentacarbonyl and the nitrite of the metal desired generally at temperatures from room temperature to about 100° C., and preferably in the range 35–60° C. For ease of availability, greater reactivity and simpler handling, the alkali metal nitrites and the alkali metal salts of iron carbonyl hydride will generally be used in these preparative methods, thereby resulting directly in the formation of the corresponding alkali metal salts of iron nitrosyl carbonyl hydride. The heavier metal salts, including the amminemetal and aminometal, and chelate salts of the heavier metals, can easily be prepared from these more readily available alkali salts of iron nitrosyl carbonyl hydride by direct simple metathesis in aqueous solution between the alkali metal salt and a soluble salt of the other metal involved.

In all these preparative methods, substantially equimolar portions of the various reactants will be used to simplify purification. The alkali metal salts are generally organic soluble and can be extracted and purified by solution in conventional organic solvents, such as the lower alcohols, especially the alkanols of about one to six carbons; the liquid hydrocarbon ethers, particularly the lower aliphatic ethers, such as diethyl ether, dibutyl ether and the like; the liquid carboxylic acid esters, particularly the lower aliphatic hydrocarbon esters of lower alkanoic monocarboxylic acids, such as ethyl acetate and the like. The heavier metal salts, especially the salts of group II metals are generally of low organic solubility as well as low aqueous solubility. The heavier metal chelate, metal ammine and amino salts are organic soluble but less so than the alkali metal salts.

This invention is generic to the salts of the monobasic acid iron nitrosyl carbonyl hydride of the formula,

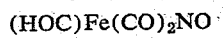

The salts of this invention can thus be simply described as the metal, including the ammine or amino metal, and ammonium, including substituted ammonium salts of iron nitrosyl carbonyl hydride and can be represented by the following structural formula:

wherein M is used to represent the positive ionically charged portion of the salt, including the metals of groups I, II, VI, VII, and VIII of the periodic table, which can be the simple metals themselves as well as metal complexes and chelates, metal ammine or metal amino, and the ammonium and substituted ammonium ionic positively charged ions, and $x$ is a simple integer usually from one to four corresponding to the unsatisfied formal valence of the positive M portion of the salt. The overall salts are thus neutral.

In the foregoing, the new products of this invention have generically been referred to simply as salts. This is believed to be the only proper terminology to apply to the simple alkali metal products and to most of the alkaline earth metal products. However, with the heavier metals, particularly the transition metals of groups VI, VII, and VIII, the products are usually more complex in structure, as indicated in the examples. These compounds are probably best described simply as complex salts or perhaps more desirably as coordination complexes. It is to be noted that these compounds of the heavier metals, as illustrated in the examples, are not water-soluble, but are organic-soluble, which is indicative of their so-called coordination character.

The naming of such compounds in this complex inorganic field has not as yet been universally settled and there are accordingly several methods used in the art for naming such compounds. Accordingly, the products of the present invention, particularly those with the heavier metals, especially with added ammonia or amine molecules, can be referred to in terms other than the simple salt terminology previously used. Thus, the product of Example III could also be called bis(tricarbonyl nitrosyl iron(0))tris(ethyelenediamino)nickel(II) or bis(tricarbonyl nitrosyl ferrato(0))tris(ethylenediamino)nickel-(II). In such nomenclature, the numbers in parentheses, conventionally Roman numerals except for zero, are used to indicate the valence stage of the metal involved. Thus, in both methods of naming, it is clear that the iron is at a zero valence stage and yet is involved in a complex anion formation, two of which satisfy the two formal valences of the nickel.

Similarly, the product of Example IV can also be referred to as bis(tricarbonyl nitrosyl iron(0)) diammine cadmium(II). The product of Example V can also be referred to as bis(tricarbonyl nitrosyl iron(0))tris(ethylenediamino)cadmium(II). The term "iron(0)" in the name of each of the last two compounds can optionally be replaced by "ferrato(0)."

The salts of iron nitrosyl carbonyl hydride herein described are generically colored, crystalline, photosensitive solids ranging in shade from light yellow to dark redorange-brown, varying with the nature of the positive, e. g., metal, ammonium, or substituted ammonium etc., moiety of the salt.

These new salts are useful as catalysts for the oxidation of hydrocarbons, especially for oxidation of alkaryl hydrocarbons to aromatic carboxylic acids. For example, the potassium salt of iron nitrosyl carbonyl hydride, when present in amounts as low as 0.1% catalyzes the oxidation with oxygen of p-xylene to mixed p-terephthalic acid and p-toluic acid in one case at temperatures of 135–139° C. for a period of time of 3.5 hours. Under identical conditions with p-xylene alone, no oxidation occurs. A further use of these salts is as catalysts for reactions involving the use of acetylene, ethylene or other reactive unsaturated, generally gaseous hydrocarbons or carbon monoxide or nitric oxide, and are generally most efficient in catalyzing such reactions carried out under superatmospheric pressure in both the liquid and gas phases. Since the salts of iron nitrosyl carbonyl hydride are photosensitive and at the same time quite stable thermally, they are also useful in photographic compositions and in light-activated reactions.

As many apparently widely different embodiments of this invention may be made without departing from the spirit and scope thereof, it is to be understood that this invention is not limited to the specific embodiments thereof except as defined in the appended claims.

I claim:

1. A process for the preparation of a metal salt of iron nitrosyl carbonyl hydride wherein the salt of iron carbonyl hydride and said metal is reacted with a soluble nitrite salt in an aqueous reaction medium at a temperature of about 65–100° C.

2. A process for the preparation of a metal salt of iron nitrosyl carbonyl hydride wherein iron pentacarbonyl is reacted with the nitrite of the metal desired in an inert organic medium at a temperature in the range of between about room temperature and about 100° C.

3. A process for the preparation of a salt of iron nitrosyl carbonyl hydride wherein a salt of iron carbonyl hydride is reacted with a soluble nitrite salt in an aqueous reaction medium at a temperature of about 65–100° C.

4. A process for the preparation of a salt of iron nitrosyl carbonyl hydride wherein iron pentacarbonyl is reacted at a temperature of about 35–60° C. with a nitrite in an inert organic medium, the said nitrite having as its positive ionic portion the corresponding ion of the desired salt.

5. A process for the preparation of a salt of iron nitrosyl carbonyl hydride which comprises the step of reacting an iron carbonyl compound containing only one iron atom per molecule with a nitrite in solution and at a temperature not above about 100° C.

6. The method of preparing the ion $$[(OC)Fe(CO)_2NO]^-$$

which comprises reacting a member of the group consisting of iron pentacarbonyl and the salts of iron carbonyl hydride with the nitrite ion in a solution and at a temperature not above about 100° C.

7. The invention of claim 6 in which iron pentacarbonyl is reacted with a nitrite in an inert organic medium.

8. The invention of claim 6 in which a salt of iron carbonyl hydride is reacted with the nitrite ion in aqueous solution.

9. The invention of claim 8 in which the temperature is at least 65° C.

10. The potassium salt of the iron nitrosyl carbonyl hydride $(HOC)Fe(CO)_2NO$.

11. The tris(ethylenediamino)nickel-bis salt of the iron nitrosyl carbonyl hydride $(HOC)Fe(CO)_2NO$.

12. The diammine cadmium-bis salt of the iron nitrosyl carbonyl hydride $(HOC)Fe(CO)_2NO$.

13. The tris(ethylenediamino)cadmium-bis salt of the iron nitrosyl carbonyl hydride $(HOC)Fe(CO)_2NO$.

14. A nickel salt of the iron nitrosyl carbonyl hydride $(HOC)Fe(CO)_2NO$.

15. A cadmium salt of the iron nitrosyl carbonyl hydride $(HOC)Fe(CO)_2NO$.

16. An alkali metal salt of the iron nitrosyl carbonyl hydride $(HOC)Fe(CO)_2NO$.

17. A metal salt of the iron nitrosyl carbonyl hydride $(HOC)Fe(CO)_2NO$.

18. A salt of the iron nitrosyl carbonyl hydride $(HOC)Fe(CO)_2NO$.

References Cited in the file of this patent

UNITED STATES PATENTS 2,689,261   Reppe _____ Sept. 14, 1954

OTHER REFERENCES

Ephraim: "Inorganic Chemistry," Nordeman Publishing Co., Inc., New York, N. Y., page 790, 4th ed., 1943.

Anderson et al.: "Zeitschrift für Anorganische und Allgemeine Chemie," vol. 208, pages 238–248 (1932).

Mellor: "Comprehensive Treatise on Inorganic and Theoretical Chemistry," 1924, vol. V, page 960.